(12) United States Patent
Twiss

(10) Patent No.: X8195
(45) Date of Patent: May 13, 1834

(54) PENDULUM, BALANCE

(76) Inventor: Hiram Twiss

Hiram Twiss of Meriden Connecticut

Letters Patent

The Schedule referred to in these Letters Patent and making part of the same containing a description in the words of the said Hiram Twiss himself of his improvement called "Twiss" improved balance pendulum.

To whom these presents shall come. Be it known that I Hiram Twiss of Meriden in the County of New Haven in the State of Connecticut have invented constructed, made and applied to use a new and useful improvement in the balance pendulum whereby the same may be adapted to regulate the movements of any clock or time piece either of wood brass or other metal, called "Twiss" improved balance pendulum. My improved balance pendulum consists in a bar of wood or metal armed with weights at each end falling about half an inch below the centre of motion either by a curve in the bar or attaching the weight to the under side of it. The bar may be thirteen inches in length more or less for common use armed with a ball of about six ounces weight at each end. This bar thus armed with weights is nicely and accurately balanced on an axis about three inches long crossing the bar in the centre at right angles. This axis may be supported at each end on knife edges on the under side playing in angular sockets. or which I prefer on points passing perpendicularly thro the axis near each end or otherwise inserted into the under side near the ends and projecting about one eighth of an inch. These edges or points should be of steel well tempered. and I have found on trial that the point of a well made darning needle passed through the axis at each end to answer the purpose well.

These points are each to play in a female centre or hollow one sixteenth of an inch deep, one eighth of an inch broad at the top and having a flat surface one thirtieth of an inch diameter at the bottom also well tempered. The ends of the pendulum thus balanced, vibrate up and down with the least possible friction. and the balance pendulum thus improved is well adapted to regulate the movements of any kind of clock or time pieces and may be connect-
ed in the following manner. This pendulum is supported on a stand
or shelf near the bottom of the clock case. From the axis of
the pendulum a wire rises perpendicularly about three inches
long and passing through a loop at the lower end of a pendulum
rod, which passes thro' the [illegible] wire of the verge, thereby al-
lows the time wheels of the clock to move when the balance pend-
ulum vibrates. A spring of rolled wire or other suitable materi-
al is also inserted into the axle and descends perpendicularly
about two inches into a regulator. The regulator consists of an an-
gular socket of metal resembling the space between two large
teeth of a saw inverted, about one sixteenth of an inch thick, this
socket opens on the top about three fourths of an inch and is sup-
ported on a stud of metal about two inches long rising from the
bottom of the clock case directly under the axle of the balance
and so as to permit the descending spring to touch the sides of the
socket at each vibration of the balance. The lower end of the stud
is a screw passing through a nut resting on the bottom of the clock
case and prevented from rising by a loop or bridge made fast
to the bottom of the case through which the stud also passes. So
that by turning the nut held to its place by the bridge, the stud will
rise or fall and carry with it up or down the regulator which is
guided by a mortise thro which it moves in a plate of metal
attached to the shelf which supports the pendulum. raising
or lowering the regulator will accelerate or retard the vibrations
This improved pendulum will also regulate itself as to the ef-
fects of heat and cold. in as much as the expansion and contrac-
tion of this pendulum is counteracted by the corresponding contrac-
tion or expansion of the regulator The balance pendulum above
above described is calculated for and I regulate it so as to give
forty five strokes in a minute, whereas the suspended pendulums
in common use usually give ninety. This invention will lead to use-
ful improvements in the construction of all time pieces regulated by the vibrations of pendulums. I do not claim as my invention a balance pendulum as such, but I do claim as my invention and improvement the mode of suspending the same as above descri bed whereby. First the weight is placed on a single bar below the centre of motion thereby producing a repelling action in the balance. Second. In vibrating on knife edges or points whereby the fric- tion is greatly reduced. Third in connecting it with a regulator by means of which the effects of heat and cold in the metal is counteracted. and also by means of which the spring of the balance pressing on the sides of the socket of the regulator assists the recoil of the balance when at the highest point of vibration and most disposed to remain at rest. In testimony that the fore going is a true and full specification of my improvement I subscribe these presents the twelfth day of Dec.r 1833

Witnesses
Simeon Baldwin
Ebenezer Baldwin

Hiram Tuft[illegible]

Exd.
W.G.

(948 Words)